United States Patent [19]

Chou et al.

[11] Patent Number: 5,353,124
[45] Date of Patent: Oct. 4, 1994

[54] METHOD OF PROVIDING CONFIDENTIAL TREATMENT FOR FACSIMILE TRANSMISSIONS

[75] Inventors: Wayne W. Chou, Ridgefield; Joseph M. Kulinets, Stamford, both of Conn.

[73] Assignee: Software Security, Inc., Darien, Conn.

[21] Appl. No.: 137,588

[22] Filed: Oct. 15, 1993

[51] Int. Cl.⁵ .............................................. H04N 1/00
[52] U.S. Cl. ................................. 358/400; 358/435; 358/444; 358/468; 358/407; 358/434
[58] Field of Search ............... 358/400, 468, 407, 434, 358/435, 442, 402, 440, 467, 444, 426; 380/18, 54; 382/48, 56; 340/825.34, 825.31, 825.44

[56] References Cited

U.S. PATENT DOCUMENTS

| | | | |
|---|---|---|---|
| 4,994,926 | 2/1991 | Gordon et al. | 358/407 |
| 5,068,888 | 11/1991 | Scherk et al. | 358/407 |
| 5,159,630 | 10/1992 | Tseng et al. | 380/18 |
| 5,222,136 | 6/1993 | Rasmussen et al. | 380/18 |
| 5,255,106 | 10/1993 | Castro | 358/440 |
| 5,258,998 | 11/1993 | Koide | 358/434 |

Primary Examiner—Edward L. Coles, Sr.
Assistant Examiner—Fan Lee
Attorney, Agent, or Firm—Parmelee, Bollinger & Bramblett

[57] ABSTRACT

In order to provide office security for receiving facsimile transmissions, a particular key or password of a receiver of a transmission is sent to the sender. The sender of a facsimile message incorporates the graphic pattern of the key of the receiver in a predetermined location on the first page of the facsimile message which is intercepted at the receiving end by a security reader which looks for the key. If the key is present, the message is placed in storage where it may be retrieved by the receiver by simply keyboarding the password related to the key to retrieve the stored message. If the key is not present, the facsimile transmission is sent on to a standard facsimile machine of the receiver.

2 Claims, 1 Drawing Sheet

METHOD OF PROVIDING CONFIDENTIAL TREATMENT FOR FACSIMILE TRANSMISSIONS

BACKGROUND OF THE INVENTION

This invention relates to a method for providing confidential treatment for facsimile transmissions using standard facsimile machines which are not provided with built-in coding and decoding systems.

All types of businesses, both small and large, have incorporated fax machines as a necessary element in doing business. Fax machines have their own telephone lines and in many cases are stationed in central locations of a business, for example, in a copy or mail room or otherwise accessible to a large number of people in the business. Accordingly, the fax messages are readily accessible and readable by many or all levels of the employees of the business. There are times when sensitive messages are received where a certain amount of confidentiality is desirable, if not required. One solution to the problem is to provide a fax machine which actually incorporates coding and decoding equipment. Such machines are expensive and are not normally required in the ordinary business as usual transmissions.

Accordingly, it would desirable to provide selected confidential treatment for facsimile transmissions which do not require separate machines, telephone lines or special fax equipment for encrypting and decrypting the facsimile transmissions.

SUMMARY OF THE INVENTION

Accordingly, it is an object of this invention to provide a new and improved method of providing confidential treatment for facsimile transmissions which can be utilized with standard facsimile machines which do not employ the transmission and reception of encrypted messages.

Still another object of this invention is to provide a new and improved method of providing confidential treatment for facsimile transmissions which is simple in operation, which can be utilized with standard machines, and which is cost effective.

In carrying out this invention in one illustrative embodiment thereof, a method for providing confidential treatment for facsimile transmissions comprises the steps of adopting a key having a graphic pattern by the receiver which is communicated to the prospective senders. The sender then incorporates the graphic pattern of the receiver's key in the predetermined location on the first page of the facsimile message to be treated confidentially and transmits the message to the receiver. All incoming messages at the receiving end are intercepted and searched for the presence of the receiver's key. If the key is found, the facsimile message is stored and can be retrieved by the receiver later upon entering the predetermined password and/or presenting the required hardware token associated with a said particular key in the presence of the recipient. If the key is not found, the facsimile message is immediately printed on the receiver's fax machine.

BRIEF DESCRIPTION OF THE DRAWINGS

The invention, together with further objects, advantages, features and aspects thereof, will be more clearly understood from the following description taken in connection with the accompanying drawings.

DESCRIPTION OF THE PREFERRED EMBODIMENTS

Figure 1:
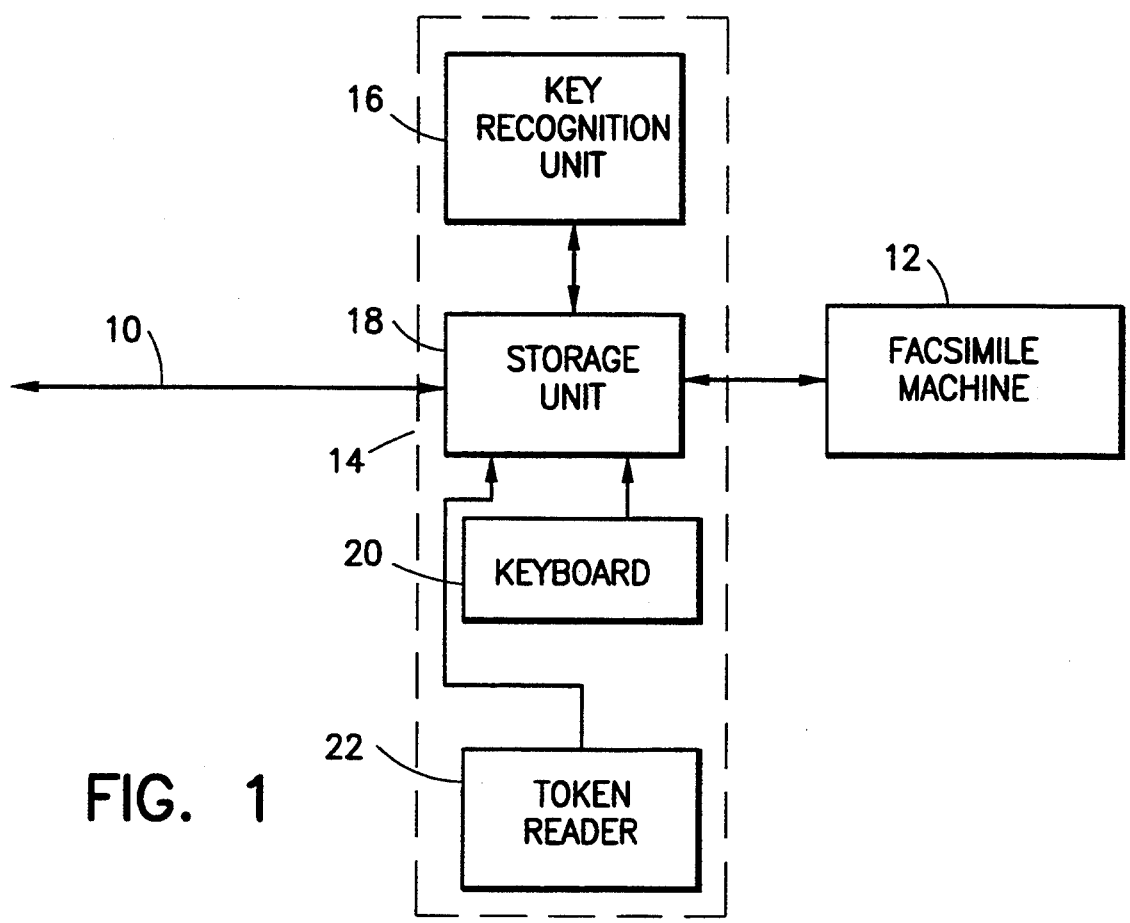
FIG. 1 is a block diagram of the equipment employed in the method for providing confidential treatment of facsimile transmissions in accordance with the present invention.

Referring now to FIG. 1, in order to provide confidential treatment for incoming fax transmissions a telephone line 10 is coupled to a standard facsimile machine 12 through the security device 14. The facsimile machine 12, referred to as the fax, is a standard type machine having no encryption or decryption equipment built in. It transmits the facsimile messages in a regular way, that go through the security device 14 unchanged into the phone line 10.

Accordingly, any fax message directed to the fax number of the telephone line 10 and not intended to be treated confidentially should go through the security device 14 directly to the fax 12. However, in order to provide confidential treatment for incoming fax messages, the security device 14 intercepts all messages received on the phone line 10 before they are applied to the fax 12. The security device 14 can be coupled between any regular facsimile hookup and facsimile machine without any special equipment or other devices.

The security device 14 includes a key recognition unit 16, a storage unit 18, a keyboard 20 and/or token reader 22 such as a smart card reader, magnetic strip card reader, etc.

In accordance with the present invention, the prospective receiver of messages to be treated confidentially sends a password or key that is essentially his confidential mailbox address to all prospective senders of such messages. The key could be a number or any other piece of data that could have a graphic pattern.

In another scenario such a personal receiver's key could be obtained by the prospective sender from a phone directory or by any other means.

Accordingly, the facsimile message may be protected by the sender deciding whether or not that particular message is to be protected.

If so, during the preparation of the fax message to be treated confidentially, the sender incorporates the graphic pattern of the receiver's key in a predetermined position on the first page of the message to be transmitted. The key can be presented in the form of a particular pattern, a bar code, a group of numbers or characters, etc. which may be detected at the receiving end. This key would actually correspond to a confidential mailbox address for the recipient.

Figure 2:
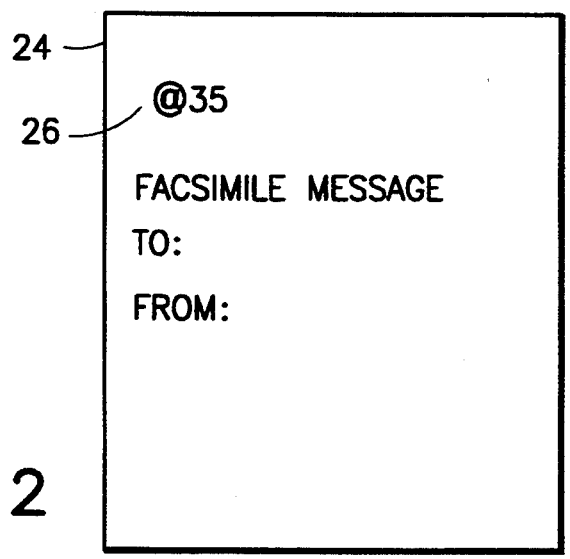
FIG. 2 is a drawing illustrating the possible incorporation of the key in the facsimile message to be treated confidentially.

Referring now to FIG. 2, the first page 24 of the fax message to be treated confidentially has the key pattern 26 incorporated thereon. In the example used for illustrative purposes, the pattern 26 has the form of the number containing two stylized numeric characters 3 and 5 preceded by the @ sign.

On receipt of the fax message on the telephone line 10, the security device 14 answers to the facsimile machine of the sender and exchanges the required signals with it as a regular fax machine.

Upon receiving of the message, the key recognizing unit 16 of the security device 14 searches the stored message for the key pattern 26. The key recognizing unit 16 can be a microprocessor or microcontroller combined with the required volume of a RAM memory.

If the security device 14 does not find the proper key, the message is applied to the fax machine 12. The security device 14 acts as a transmitting fax machine and exchanges the required signals with fax machine 12 to reproduce the fax message on the fax machine 12. In this case, the message awaits the recipient under normal circumstances with no selective confidential treatment.

If security device 14 finds and recognizes the key pattern 26, the message along with its accompanying key is stored in the storage unit 18 along with other confidential messages intended for this or other recipients until it is retrieved. Each message stored in the storage unit 18 is accompanied with the corresponding key. The key could be stored in a separate memory of the storage unit 18 together with a pointer to the beginning of the message and its length. The storage unit 18 can utilize any form of the storage media such as memory chips, magnetic tape, magnetic or optical disks, etc.

When any particular recipient wants to retrieve the stored messages that are addressed to him or her, he or she simply types in the password associated with the key using the keyboard 20 of the security device 14.

Simultaneously, a requirement could be provided for the presentation of a hardware token such as a smart card, a magnetic strip card, etc.

The storage unit 18 finds the key associated with the typed password and/or presented token, and retrieves one by one all fax messages that are addressed to the owner of the password which are stored in the associated mailbox.

Each message is simply read back from the storage unit 18 and applied to the fax machine 12. The security device 14 acts as a transmitting fax machine and exchanges the required signals with fax machine 12 to reproduce the fax message on the fax machine 12. Accordingly, all the fax messages to be treated confidential and addressed to a particular recipient are printed on the fax machine 12 only in his or her presence to prevent interception or others from seeing the message.

Accordingly, a very simple and less expensive arrangement which can be adopted for all standard fax machines is provided in which a security device may be attached to a telephone line along with the fax machine which can be utilized to provide selective confidential treatment of fax messages at the selection of the sender. The security device which is used requires no special equipment for the encryption or decryption of the message involved and simply requires that the sender and recipient each have access to the key which is utilized to have the message diverted and put in storage until it can be recovered by the confidential recipient.

Since other modifications and changes vary to fit particular operating requirements and environments, will be apparent to those skilled in the art, the invention is not considered limited to the examples chosen for purposes of disclosure and covers all modifications and changes which do not constitute departures from the true spirit and scope of this invention.

We claim:

1. A method of providing confidential treatment on the receiver end of facsimile transmissions between a sender and a recipient having a standard facsimile machine comprising the steps of adopting a key having a graphic pattern by the recipient, thereby providing the recipient with a mailbox address, communicating said key by said recipient to a sender, incorporating said recipient's graphic pattern of said key by a sender in a predetermined location on the first page of a facsimile message to be treated confidentially, attaching a security device having a key reader and a storage device between a recipient's telephone line and facsimile machine, transmitting said message to the recipient, intercepting said message by the security device on the recipient's end, searching said message by said key reader of the security device for the presence and recognition of said graphic pattern of said key, passing said message to said standard facsimile machine of the recipient, if said key is not present, storing said message in said storage device of said security device together with said key when said key accompanies said message, and transferring of said stored message to the recipient's facsimile machine upon the recipients entering the predetermined password and/or presenting a required hardware token containing the recipient's key thereby providing the recipient's mailbox address to said storage device for retrieving any messages stored in the storage device at the command of the recipient.

2. The method as set forth in claim 1 wherein the step of storing said message together with said key comprises storing a pointer for indicating the beginning of said message.

* * * * *